US011628508B2

(12) United States Patent
Liu et al.

(10) Patent No.: US 11,628,508 B2
(45) Date of Patent: Apr. 18, 2023

(54) RECIPROCATING CUTTING TOOL

(71) Applicant: Positec Power Tools (Suzhou) Co., Ltd., Jiangsu (CN)

(72) Inventors: Liangbing Liu, Jiangsu (CN); Guojun Chen, Jiangsu (CN); Mingxing Yan, Jiangsu (CN)

(73) Assignee: POSITEC POWER TOOLS (SUZHOU) CO., LTD., Jiangsu (CN)

( * ) Notice: Subject to any disclaimer, the term of this patent is extended or adjusted under 35 U.S.C. 154(b) by 59 days.

(21) Appl. No.: 16/251,994

(22) Filed: Jan. 18, 2019

(65) Prior Publication Data
US 2019/0168319 A1 Jun. 6, 2019

Related U.S. Application Data

(63) Continuation of application No. PCT/CN2017/093585, filed on Jul. 19, 2017.

(30) Foreign Application Priority Data

Jul. 19, 2016 (CN) .......................... 201610569032.2

(51) Int. Cl.
*B23D 49/00* (2006.01)
*B23D 51/20* (2006.01)
*B23D 49/08* (2006.01)

(52) U.S. Cl.
CPC ........... *B23D 49/003* (2013.01); *B23D 49/08* (2013.01); *B23D 51/20* (2013.01)

(58) Field of Classification Search
CPC ...... B23D 49/003; B23D 49/08; B23D 49/16; B23D 49/165; B23D 51/20; B23D 49/167
(Continued)

(56) References Cited

U.S. PATENT DOCUMENTS 2,775,272 A * 12/1956 Papworth ............. B23D 49/165
30/393
2,966,178 A * 12/1960 Katzfey ............... B23D 49/167
83/779
(Continued)

FOREIGN PATENT DOCUMENTS

CN 2717591 Y 8/2005
CN 202398895 U 8/2012
(Continued)

OTHER PUBLICATIONS

State Intellectual Property Office of the P.R. China, International Search Report and Written Opinion for PCT/CN2017/093585 dated Oct. 8, 2017, Beijing, China, 10 pages.

*Primary Examiner* — Evan H MacFarlane
(74) *Attorney, Agent, or Firm* — Gray Ice Higdon

(57) ABSTRACT

A reciprocating cutting tool is provided, wherein the tool has a reciprocating saw mode and a jig saw mode. The tool includes a reciprocating mechanism; an actuating mechanism and a cutter-lifting mechanism. The reciprocating mechanism includes a reciprocating rod and the cutter-lifting mechanism includes an actuating member and a pushing member. The actuating member includes a first engaging portion and a second engaging portion when the reciprocating rod is driven to perform a reciprocating motion, the reciprocating rod drives the pushing member to deflect close to the first engaging portion or second engaging portion; when the first engaging portion or the second engaging portion is driven to move close to the pushing member, the first engaging portion or second engaging portion pushes the pushing member towards the side which the first engaging portion or the second engaging portion deflects to force the reciprocating rod to implement a cutter-lifting motion.

12 Claims, 11 Drawing Sheets

(58) Field of Classification Search
USPC .......................................................... 30/393
See application file for complete search history.

(56) References Cited

U.S. PATENT DOCUMENTS

| | | | | |
|---|---|---|---|---|
| 3,095,748 | A * | 7/1963 | Stelljes et al. ....... | B23D 49/165 74/44 |
| 3,206,989 | A * | 9/1965 | Enders ................... | B23Q 5/027 74/50 |
| 3,269,197 | A * | 8/1966 | Enders ................ | B23D 49/165 74/50 |
| 3,374,814 | A * | 3/1968 | Kaufmann ........... | B23D 49/165 83/758 |
| 3,876,015 | A * | 4/1975 | Kivela ................... | A01D 69/02 173/170 |
| 3,978,862 | A | 9/1976 | Morrison | |
| 4,545,123 | A * | 10/1985 | Hartmann ............ | B23D 49/167 30/393 |
| 5,555,626 | A * | 9/1996 | Fuchs ................... | B23D 51/16 30/392 |
| 5,832,611 | A * | 11/1998 | Schmitz ................ | B23D 49/11 30/392 |
| 6,249,979 | B1 * | 6/2001 | Bednar et al. ....... | B23D 49/165 30/182 |
| 6,282,797 | B1 * | 9/2001 | Osada et al. ......... | B23D 49/165 30/392 |
| 7,430,807 | B2 * | 10/2008 | Saegesser et al. ... | B23D 49/167 30/122 |
| 10,160,048 | B2 * | 12/2018 | Weir et al. ............. | B23D 49/16 |
| 2003/0110645 | A1 * | 6/2003 | Phillips et al. ...... | B23D 49/167 30/392 |
| 2008/0189962 | A1 | 8/2008 | Reuss et al. | |

FOREIGN PATENT DOCUMENTS

| | | | | |
|---|---|---|---|---|
| CN | 103801764 | A | 5/2014 | |
| CN | 206105039 | U | 4/2017 | |
| DE | 36 08 301 | A1 * | 9/1987 | ........... B23D 49/165 |
| DE | 36 43 279 | A1 * | 6/1988 | ........... B23D 49/165 |
| DE | 37 02 670 | A1 * | 8/1988 | ........... B23D 49/165 |
| EP | 1203628 | A2 | 5/2002 | |
| EP | 1955802 | A2 | 8/2008 | |
| JP | 2002192419 | A | 7/2002 | |
| JP | 2009154340 | A | 7/2009 | |
| WO | 2012/094997 | A1 * | 7/2012 | ........... B23D 49/167 |

* cited by examiner

RECIPROCATING CUTTING TOOL

BACKGROUND

Technical Field

The present invention relates to a reciprocating cutting tool, and in particular, to a reciprocating cutting tool having a two-way cutter-lifting function.

Related Art

An electric saw, as a reciprocating cutting tool to cut materials such as wood, stone, and steel, is widely applied to various fields, thereby improving the production efficiency and bringing extraordinary convenience to people's life. The electric saw usually includes a housing, a motor installed in the housing, and a saw blade driven by the motor to perform a reciprocating motion relative to the housing so as to cut a work piece. A jig saw, a reciprocating saw, and the like are all reciprocating cutting tools.

At present, many electric saws on the market have a cutter-lifting function. Under a cutter-lifting force driving a saw blade to swing, a force pointed to a work piece is applied to the saw blade, so that the saw blade can slightly swing in a direction perpendicular to a reciprocating cutting direction, thereby significantly improving the cutting efficiency. However, a single-way cutter-lifting mode on the market can only realize forward cutter lifting or backward cutter lifting of the saw blade, but cannot realize forward and backward two-way cutter lifting on one saw product.

SUMMARY

Based on this, it is necessary to provide a reciprocating cutting tool having a two-way cutter-lifting function and high cutter-lifting efficiency.

The present invention provides a reciprocating cutting tool. The reciprocating cutting tool is operable in two working modes which includes a reciprocating saw mode and a jig saw mode; the reciprocating cutting tool comprising a housing; a reciprocating mechanism; an actuating mechanism and a cutter-lifting mechanism disposed in the housing; the reciprocating mechanism comprises a reciprocating rod disposed in the housing, and the cutter-lifting mechanism comprises an actuating member and a pushing member disposed on the reciprocating rod; the actuating member comprises a first engaging portion and a second engaging portion for engaging with the pushing member respectively; when the reciprocating rod is driven to perform a reciprocating motion relative to the housing by the actuating mechanism, the reciprocating rod drives the pushing member to deflect close to the first engaging portion or the second engaging portion; and when the first engaging portion or the second engaging portion is driven to move close to the pushing member by the actuating mechanism, the first engaging portion or the second engaging portion pushes the pushing member towards the side which the first engaging portion or the second engaging portion deflects to force the reciprocating rod to implement a cutter-lifting motion.

In an embodiment, the actuating member is a fork, the first engaging portion and the second engaging portion are disposed at an interval at two opposite ends of the fork on a side close to the pushing member, the first engaging portion and the second engaging portion respectively move close to the pushing member and contact the pushing member on a corresponding side.

In an embodiment, the reciprocating mechanism comprises a gear and the reciprocating rod is eccentrically connected to the gear; the actuating mechanism comprises a power member and a transmission gear driven by the power member, and the transmission gear is driven by the power member and engages with the gear; and the reciprocating mechanism comprises a balance weight, an eccentric shaft is protrudingly disposed on a surface of the gear, the eccentric shaft is arranged in a stepped manner and comprises a high position surface and a low position surface, the fork is connected to the low position surface of the eccentric shaft, and the balance weight is disposed between the fork and the gear and is connected to the high position surface of the eccentric shaft.

In an embodiment, the high position surface is located at an end of the eccentric shaft close to the gear and the low position surface is located at an end of the eccentric shaft away from the gear.

In an embodiment, the pushing member comprises a bearing seat, the bearing seat is sleeved on the reciprocating rod in an axial direction and located below the fork.

In an embodiment, the cutter-lifting mechanism comprises a supporting seat and an oil-retaining bearing, the supporting seat is fixed to the pushing member on a surface to a connecting portion, and the oil-retaining bearing is sleeved on the reciprocating rod, and positioned between the reciprocating rod and the pushing member and is supported on the supporting seat.

In an embodiment, the reciprocating cutting tool comprises an operating unit, the operating unit comprises a locking member disposed above the pushing member, the locking member is shiftable between a fixed position where it limits the pushing member contacting with the actuating member and a movable position where it allows the pushing member contacting with the actuating member.

In an embodiment, an axis of the locking member is perpendicular to that of the reciprocating rod.

In an embodiment, the locking member is movably disposed on the pushing member close to the actuating member, and an unlocking groove is provided on the locking member along an extending direction.

In an embodiment, the locking member is of a rod shape and the unlocking groove extends in the same direction with the locking member.

In an embodiment, the operating unit comprises a mounting plate, the mounting plate is mounted on the housing, one end of the locking member is rotatably connected to the mounting plate, the other end of the locking member passes through the mounting plate and extends above the pushing member, and the unlocking groove rotates between the fixed position and the movable position when the locking member rotates relative to the mounting plate.

In an embodiment, the operating unit comprises an adjusting member, a hollow pin, and a pressure spring; a surface of the mounting plate is provided with a catching groove; the adjusting member is fixedly connected to the end of the locking member and is rotatably connected to the mounting plate with the locking member; a surface of the adjusting member facing to the mounting plate is provided with a recess; the hollow pin is movably disposed in the recess; the pressure spring abuts between the recess and the hollow pin; and the hollow pin is caught in the catching groove under a restoring force of the pressure spring.

In an embodiment, the mounting plate is provided with a positioning groove, and the positioning groove extends along a rotating trace of the locking member; and the adjusting member is provided with a protrusion embedded in and limited to the positioning groove at a position corresponding to the positioning groove.

The present invention further provides a reciprocating cutting tool, comprising a housing, a reciprocating mechanism, an actuating mechanism driving the reciprocating mechanism, and a cutter-lifting mechanism, wherein the reciprocating mechanism comprises a reciprocating rod driven by the actuating mechanism to perform a reciprocating motion;

the reciprocating cutting tool has a first working mode and a second working mode; the cutter-lifting mechanism comprises an actuating member and a pushing member; and the actuating member comprises a first engaging portion and a second engaging portion, wherein the actuating member is movable linearly, so that the first engaging portion is capable of driving the pushing member in the first working mode, and the second engaging portion is capable of driving the pushing member in the second working mode, and that the reciprocating rod is driven by the pushing member and implements a cutter-lifting motion.

In an embodiment, in the first working mode, the reciprocating rod implements a cutter-lifting motion along a first direction, and in the second working mode, the reciprocating rod implements a cutter-lifting motion along a second direction, the first direction is opposite to the second direction.

In an embodiment, the first working mode is a reciprocating saw working mode, and the second working mode is a jig saw working mode.

In an embodiment, the actuating member moves translationally in a reciprocating movement direction of the reciprocating rod.

In an embodiment, the reciprocating mechanism comprises a gear, and a first pin and a second pin disposed on the gear, the first pin is configured to drive the reciprocating rod and the second pin is configured to drive the actuating member; and an obtuse angle is formed between a connection line of a center of the first pin and a center of the gear and a connection line of a center of the second pin and the center of the gear, and the obtuse angle ranges from 120° to 130°.

In an embodiment, the obtuse angle is 125°.

In an embodiment, the first pin and the second pin are respectively disposed at two opposite end faces of the gear.

In an embodiment, the first engaging portion and the second engaging portion are respectively located on two sides of the longitudinal axis of the reciprocating rod.

The present invention further provides a reciprocating cutting tool, comprising a housing, a reciprocating mechanism, an actuating mechanism driving the reciprocating mechanism, and a cutter-lifting mechanism, wherein the reciprocating mechanism comprises a reciprocating rod driven by the actuating mechanism to perform a reciprocating motion, the cutter-lifting mechanism comprises an actuating member and a pushing member, and the actuating member comprises a first engaging portion and a second engaging portion, wherein the actuating member is movable linearly to drive the pushing member to rotate, so that when the reciprocating cutting tool is in a first working mode, the first engaging portion is capable of driving the pushing member to move the reciprocating rod along a first direction, and when the reciprocating cutting tool is in a second working mode, the second engaging portion is capable of driving the pushing member to move the reciprocating rod along a second direction.

The present invention further provides a reciprocating cutting tool, including a housing, and a actuating mechanism, a reciprocating mechanism, and a cutter-lifting mechanism that are disposed in the housing, where the reciprocating mechanism includes a reciprocating rod driven by the actuating mechanism to perform a reciprocating motion along an axis of the reciprocating rod; the reciprocating cutting tool has a first working mode and a second working mode; the cutter-lifting mechanism includes an actuating member driven by the actuating mechanism and a pushing member connected to the reciprocating rod; the actuating member includes a first engaging portion and a second engaging portion; the first engaging portion is capable of driving the pushing member in the first working mode to drive the reciprocating rod along a direction to contact a work piece; and the second engaging portion is capable of driving the pushing member in the second working mode to drive the reciprocating rod along direction to contact the work piece.

According to the reciprocating cutting tool of the present invention, in the two modes, namely, the reciprocating saw mode and the jig saw mode, the reciprocating rod deflects, under a cutting force, toward the actuating member, and the first engaging portion and the second engaging portion in the actuating member pushes the pushing member on the reciprocating rod to swing in the process of moving in a reciprocating motion, so that the cutter-lifting function of a saw blade driven by the reciprocating rod in two different modes is achieved, so as to improve the cutting efficiency of the reciprocating cutting tool.

DETAILED DESCRIPTION

To facilitate understanding of the present invention, the following describes the present invention more thoroughly with reference to relevant accompanying drawings. The accompanying drawings provide preferred embodiments of the present invention. However, the present invention may be implemented in many different forms and is not limited to the embodiments described in this text. On the contrary, the purpose of providing the embodiments is to enable the disclosed content of the present invention to be understood more thoroughly and comprehensively.

It should be noted that when an element is referred to be "fixed to" another element, the element may be directly on the another element or there may be an intermediate element. When an element is considered to be "connected to" another element, the element may be directly connected to the another element, or there may be an intermediate element.

Unless otherwise specified, all technical and scientific terms used in the text have the same meanings understood by a person skilled in the art to which the present invention pertains. The terms used in the specification of the present invention in the text are used merely for describing specific embodiments, and are not intended to limit the present invention. The term "and/or" used in the text includes any or all combinations of one or more relevant listed items.

Figure 1:
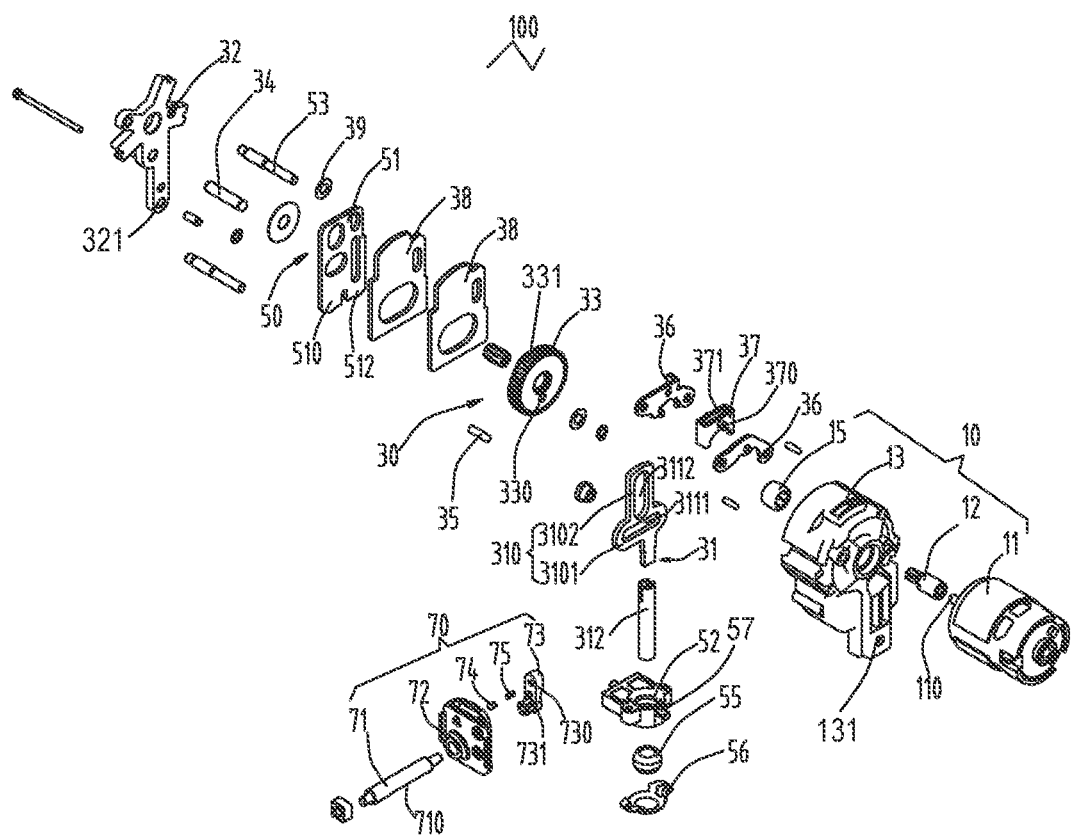
FIG. 1 is a schematic exploded diagram of a part of a reciprocating cutting tool according to a first specific embodiment of the present invention.

Referring to FIG. 1, in a preferred embodiment of the present invention, a reciprocating cutting tool 100 includes a housing (not shown), an actuating mechanism 10, a reciprocating mechanism 30, and a cutter-lifting mechanism 50. The actuating mechanism 10 is disposed in the housing, the reciprocating mechanism 30 includes a reciprocating rod 31 disposed in the housing and driven by the actuating mechanism 10 to perform a reciprocating motion relative to the housing and an axis of the reciprocating rod 31, and a saw blade (not shown) connected to the reciprocating rod 31 and extending out of the housing. The cutter-lifting mechanism 50 is disposed in the housing and includes an actuating member 51 driven by the actuating mechanism 10 to perform a reciprocating motion relative to the housing and a pushing member 52 disposed on the reciprocating rod 31. The actuating member 51 includes a first engaging portion 510 and a second engaging portion 512 respectively engaging with the pushing member 52.

Figure 10:
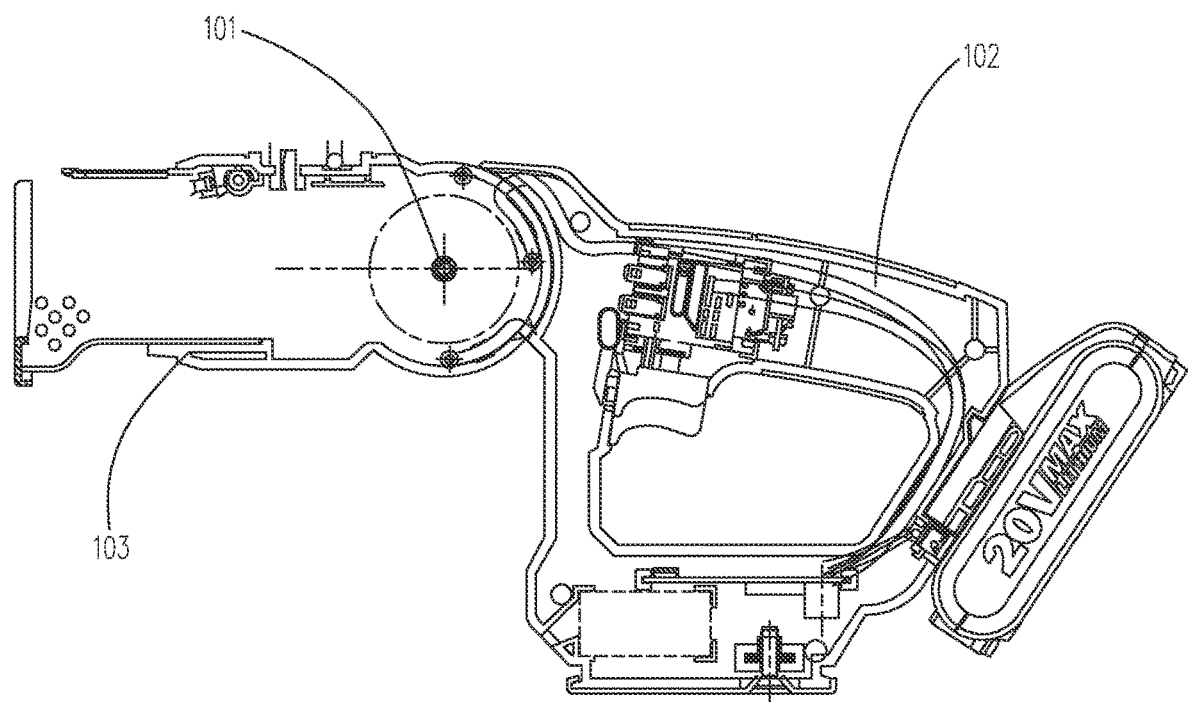
FIG. 10 is a schematic structural diagram of a reciprocating saw working mode of a reciprocating cutting tool according to the present invention.
Figure 11:
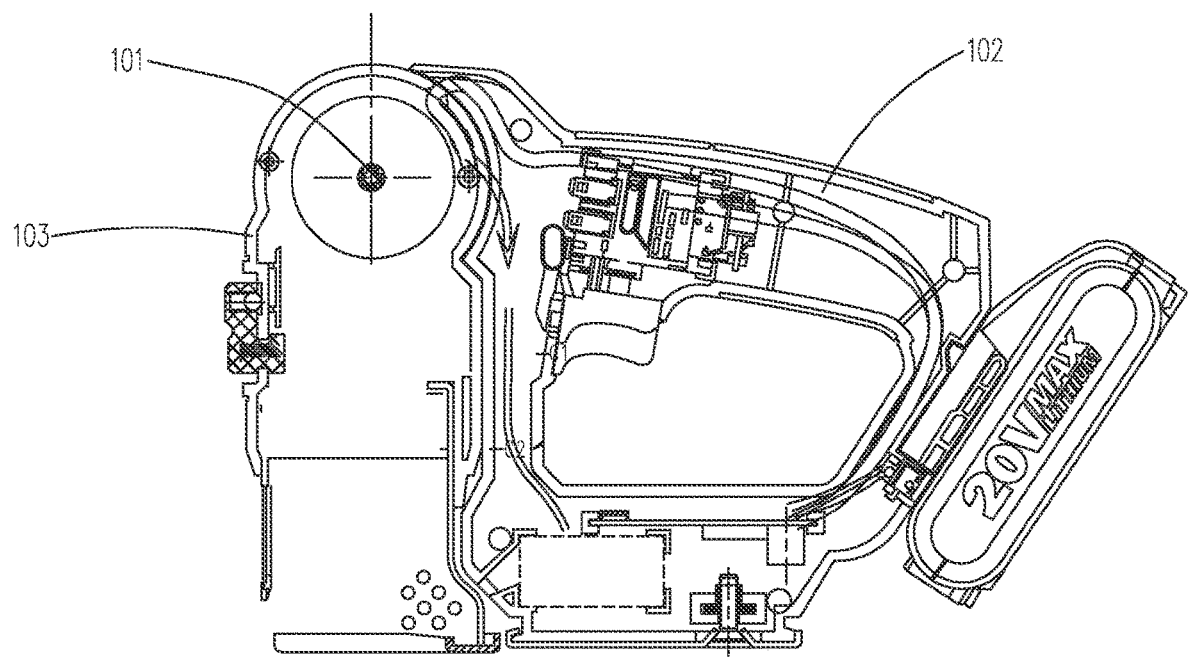
FIG. 11 is a schematic structural diagram of a jig saw working mode of a reciprocating cutting tool according to the present invention.

In this specific embodiment, the reciprocating cutting tool 100 is a multifunctional saw having two cutting working modes, namely, a reciprocating saw mode (corresponding to a first working mode) and a jig saw mode (corresponding to a second working mode). In combination with FIG. 10, the housing includes a first housing 102, a second housing 103, and a rotary shaft 101 connecting the first housing and the second housing. In the first working mode, the first housing 102 is substantially linearly connected to the second housing 103 and the reciprocating cutting tool 100 is used as a reciprocating saw. In combination with FIG. 11, the second housing 103 is rotated by 90° relative to the first housing 102, the first housing 102 is substantially vertically connected to the second housing 103 and the reciprocating cutting tool 100 is used as a jig saw.

In the two working modes, due to different operating manners, two cutting forces in different directions are respectively applied to a saw blade 200 by a work piece 300 during cutting of the work piece. Certainly, the two cutting modes are not limited herein. For example, saw blades of a reciprocating saw may be respectively installed in forward and reverse directions, thereby implementing cutting in two opposite directions. An end of the reciprocating rod 31 connected to the saw blade drives, under a corresponding cutting force, the pushing member 52 to deflect close to the first engaging portion 510 or the second engaging portion 512. In the first working mode, the first engaging portion 510 pushes the pushing member 52 to deflect close to the direction which the first engaging portion 510 deflects when moving, driven by the actuating mechanism 10, toward the pushing member 52, to force the reciprocating rod 31 to implement a cutter-lifting motion. In the second working mode, the second engaging portion 512 pushes the pushing member 52 to deflect close to the direction which the second engaging portion 512 deflects when moving, driven by the actuating mechanism 10, toward the pushing member 52, to force the reciprocating rod 31 to implement a cutter-lifting motion. Therefore, a two-way cutter-lifting function of the reciprocating cutting tool 100 in the two different working modes is achieved. It should be noted that, in the first working mode, the reciprocating rod implements a cutter-lifting motion in a first direction, and in the second working mode, the reciprocating rod implements a cutter-lifting motion in a second direction, the first direction being opposite to the second direction.

Figure 2:
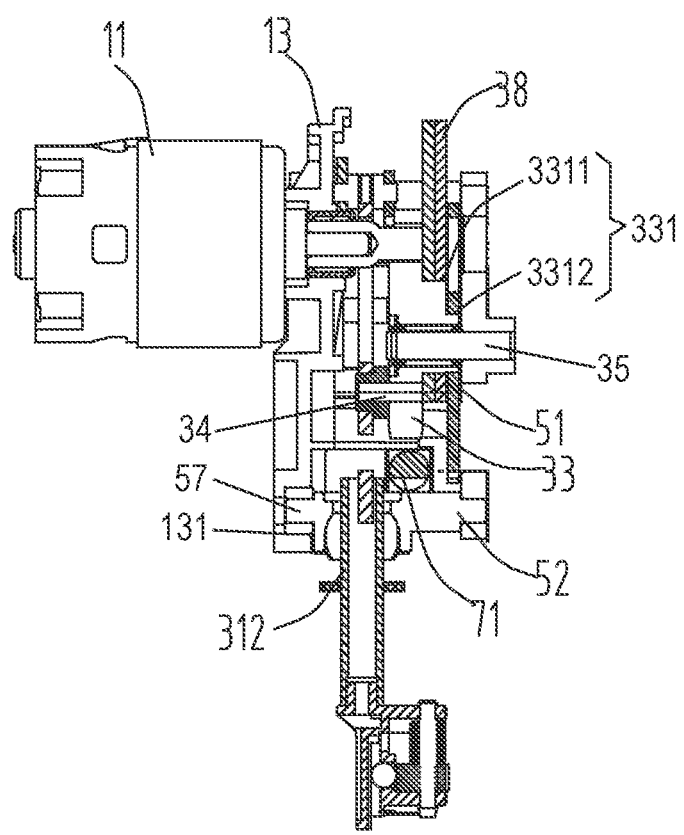
FIG. 2 is a cross-sectional view of the part of the reciprocating cutting tool shown in FIG. 1 after assembly.

Referring to FIG. 1 and FIG. 2 together, specifically, the actuating mechanism 10 includes a power member 11 and a transmission gear 12 connected to the power member 11. Preferably, the power member 11 is a DC motor in this specific embodiment. A driving spindle 110 is disposed on and protrudes from the power member 11. The transmission gear 12 is disposed on the driving spindle 110 and rotates with the driving spindle 110. It should be understood that, in other embodiments, a gear may be directly formed at an end of the driving spindle 110, and the present invention is not limited herein.

Further, the actuating mechanism 10 further includes a bushing 13 and a shaft sleeve 15. The power member 11 is installed on the bushing 13 and is fixed to the housing through the bushing 13, to reduce vibration brought by the power member 11 to the entire reciprocating cutting tool 100. The driving spindle 110 passes through the bushing 13 and extends out of the bushing 13. The shaft sleeve 15 is disposed between the transmission gear 12, which is disposed on the driving spindle 110 and the bushing 13, and is configured to reduce friction between the transmission gear 12 and the bushing 13, thereby prolonging the service life of the power member 11 and improving the lubrication efficiency of the power member 11.

The reciprocating mechanism 30 includes a middle cover 32, a gear 33, a fixing pin 34, and a revolving shaft 35. The middle cover 32 is disposed on the housing, and the gear 33 is connected to the middle cover 32 through the fixing pin 34 and is engaged with the transmission gear 12, so as to rotate under the drive of the transmission gear 12. The reciprocating rod 31 is eccentrically connected to the gear 33 and performs a reciprocating motion relative to the housing under the drive of the gear 33.

Specifically, a stepped shaft 331 (as shown in FIG. 2) is disposed on and protrudes from an end face of the gear 33 back to the reciprocating rod 31. The stepped shaft 331 includes a large diameter portion 3311 and a small diameter portion 3312 arranged in a stepped manner. The gear 33 is provided with an eccentric hole 330. In this specific embodiment, the large diameter portion 3311 is located at an end of the stepped shaft 331 close to the gear 33, and the small diameter portion 3312 is located at an end of the stepped shaft 331 away from the gear 33.

The reciprocating rod 31 includes a connecting portion 310 and a rod portion 312 connected to the connecting portion 310. The connecting portion 310 is substantially in a cross shape and includes a first branch 3101 and a second branch 3102 disposed in cross with the first branch 3101. The first branch 3101 is disposed in a transverse direction perpendicular to an axial direction of the rod portion 312 and is provided with a first opening 3111 extending transversely. One end of the revolving shaft 35 is fixed in the eccentric hole 330, and the other end of the revolving shaft 35 passes through the first opening 3111, to drive the reciprocating rod 31 to perform a reciprocating motion relative to the housing when the gear 33 rotates. Certainly, the cylinder revolving shaft 35 further drives the reciprocating rod to perform a reciprocating motion, and therefore the cylinder revolving shaft 35 can be referred to as a transmission pin, that is, a first pin. The second branch 3102 is disposed on the first branch 3101 in a longitudinal direction parallel to the axial direction of the rod portion 312, and an end of the second branch 3102 is provided with a second opening 3112 extending in a longitudinal direction. The end of the driving spindle 110 on which the transmission gear 12 is disposed passes through the second opening 3112, so that the transmission gear 12 engages with the gear 33.

The rod portion 312 is connected to the first branch 3101 and is configured to install a saw blade. In this specific embodiment, the first opening 3111 and the second opening 3112 are kidney holes arranged perpendicular to each other.

Further, the reciprocating mechanism 30 includes two cover plates 36 and a positioning block 37 disposed between the two cover plates 36. The two cover plates 36 face toward each other and are fixed to the bushing 13 at an interval. The positioning block 37 is sandwiched between the two cover plates 36, and a pivoting shaft 370 is formed and protrudes from two surfaces of the positioning block 37 facing toward the two cover plates 36 correspondingly. Two ends of the positioning block 37 in a direction perpendicular to an axial direction of the pivoting shaft 370 are perforated to form a through hole 371. The second branch 3102 is free in the axial direction of the rod portion 312 after passing through the through hole 371 and is fixedly limited to the positioning block 37 in a direction perpendicular to the axial direction of the rod portion 312, so as to limit the reciprocating rod 31 to perform a reciprocating motion in the axial direction and to be fixed in a direction perpendicular to the axial direction of the reciprocating rod 31. In this way, rotation movement of the power member 11 is converted to the reciprocating movement of the reciprocating rod 31 in the axial direction through the driving spindle 110, the transmission gear 12, and the gear 33, so that the reciprocating rod 31 further drives the saw blade disposed at a tail end of the rod portion 312 to perform a reciprocating cutting action.

The actuating member 51 is a fork connected to the small diameter portion 3312 of the stepped shaft 331 disposed on the gear 33. That is, the small diameter portion 3312 forms a second pin (different from the first pin) disposed on the gear 33 and deviated from a center O1 of the gear. The fork is capable of moving translationally in a reciprocating movement direction of the reciprocating rod 31 under the drive of the gear 33. In other words, the movement of the actuating member 51 is linear movement, the actuating member 51 drives the pushing member 52 to rotate at the same time, and the reciprocating rod performs a reciprocating motion relative to the pushing member and rotates (a rotating axis by which the reciprocating rod rotates is different from the pushing member). The structure is simple and stable relative to other structures.

Figure 4:
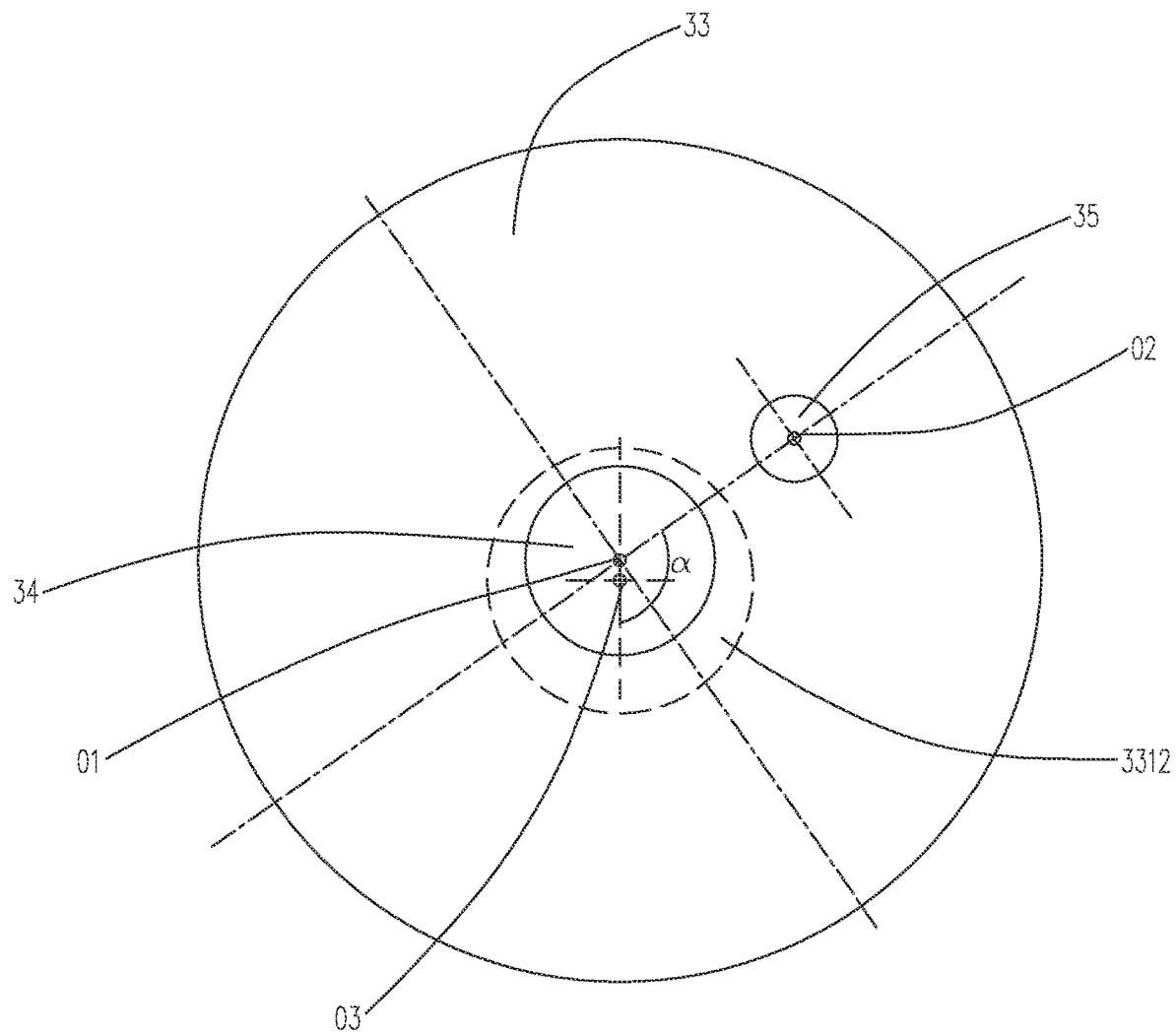
FIG. 4 is a schematic elevational view of a gear shown in FIG. 1.

In combination with FIG. 4, an obtuse angle α is included between a connection line of a center O2 of the revolving shaft 35 (the first pin) and the center O1 of the gear 33 and a connection line of a center O3 of the second pin (the second pin is located at an opposite end face and is therefore indicated by a dashed line) and the center O1 of the gear 33.

A degree of a preferably ranges from 120° to 130°. If the degree of a is 125°, it can be ensured that an action is performed on the reciprocating rod by the pushing member driven by the actuating member during each return, and therefore the cutter-lifting effect is optimal and the cutting efficiency is high. Certainly, the cutter-lifting can also be implemented if the degree of a does not fall within the foregoing range, but the corresponding cutter-lifting effect is relatively poor.

The first engaging portion 510 and the second engaging portion 512 are disposed at two opposite ends of the fork close to the pushing member 52. In this specific embodiment, the actuating member 51 is in a rectangular plate shape, and the first engaging portion 510 and the second engaging portion 512 used in the two working modes, namely, the reciprocating saw mode and the jig saw mode, for pushing the pushing member 52 on the corresponding side are disposed as an entire component. It should be understood that, in other embodiments, the actuating member 51 may alternatively be a component in another shape, for example, a pushrod or a thimble, and the present invention is not limited herein. In addition, the actuating member 51 may alternatively include two components. The first engaging portion 510 and the second engaging portion 512 are disposed respectively to engage with the pushing member 52.

The pushing member 52 is disposed on the rod portion 312 of the reciprocating rod 31 and is located below the actuating member 51. The pushing member 52 may perform a reciprocating motion with the reciprocating rod 31 and deflect close to the actuating member 51 with the reciprocating rod 31 when the reciprocating rod 31 deflects under a cutting force. A distance between two adjacent surfaces of the pushing member 52 and the actuating member 51 is less than or equal to a sum of a deflection amount generated by deflection of the pushing member 52 toward the actuating member 51 with the reciprocating rod 31 and a movement amount of downward movement of the actuating member 51. In this way, when moving downward, the actuating member 51 contacts the pushing member 52 and applies a downward pushing force on the pushing member 52, so that the pushing member 52 drives, under the pushing force of the actuating member 51, the reciprocating rod 31 to implement a cutter-lifting motion. In this specific embodiment, the pushing member 52 includes a bearing seat 54 sleeved on the rod portion 312 in the axial direction.

Figure 3:
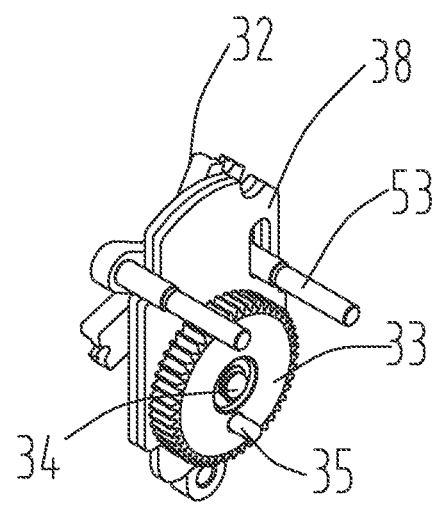
FIG. 3 is an assembly diagram of a part of the reciprocating cutting tool shown in FIG. 1.

The cutter-lifting mechanism 50 further includes a supporting seat 56 and an oil-retaining bearing 55. The supporting seat 56 is fixed on the surface of the pushing member 52 back to the connecting portion 310 of the reciprocating rod 31. The oil-retaining bearing 55 is sleeved between the rod portion 312 and the pushing member 52 and is supported on the supporting seat 56, to prolong the service life of the reciprocating rod 31 and the pushing member 52 and improve the lubrication efficiency of the reciprocating rod 31 and the pushing member 52. The reciprocating rod 31 passes through the oil-retaining bearing 56 and also passes through the pushing member 52. Front and back ends of the pushing member 52 are provided with a pivot 57. The pivot 57 extends in a direction perpendicular to the reciprocating movement direction. The pivot 57 is rotatably accommodated in a first round hole 131 provided on a lower side of the bushing 13 and a second round hole 321 provided on a lower side of the middle cover 32 respectively. In addition, the reciprocating rod 31 (the connecting portion 310 and the rod portion 312) may rotate relative to the pivoting shaft 370 on the top of the reciprocating rod 31. In combination with FIG. 5, the pushing member 52 rotates by the pivot 57, the reciprocating rod 31 rotates by the pivoting shaft 370 located at one end of the reciprocating mechanism, and the pushing member 52 and the reciprocating rod 31 are connected through the oil-retaining bearing. The oil-retaining bearing 55 rotates by an axis of the oil-retaining bearing 55, to compensate a difference in rotation between the pushing member 52 and the reciprocating rod 31, to prevent mutual influence between the pushing member 52 and the reciprocating rod 31. In this case, the oil-retaining bearing supports the rod portion 312 of the reciprocating rod in a non-reciprocating movement direction (in particular in the direction perpendicular to the reciprocating movement direction). In the reciprocating movement direction, the reciprocating rod 31 overcomes the friction of the oil-retaining bearing 55 to perform a reciprocating motion. Therefore, the oil-retaining bearing can allow the reciprocating rod to rotate relative to the pushing member and can perform a reciprocating motion. Further, referring to FIG. 3 together, the reciprocating mechanism 30 includes balance weights 38. The balance weights 38 are disposed between the actuating member 51 and the gear 33 and connected to the large diameter portion 3311 of the stepped shaft 331, and are capable of moving, under the drive of the gear 33, in a reciprocating motion relative to the housing in an extending direction of the reciprocating rod 31. The balance weights 38 and the reciprocating rod 31 move reversely at a same time. Certainly, directions of the reverse movement are opposite, to reduce impact brought by the reciprocating rod, thereby reducing vibration of the entire reciprocating cutting tool 100. In this specific embodiment, the balance weight 38 includes two, two of which disposed between the actuating member 51 and the gear 33. The actuating member 51 and the two balance weights 38 are limited to the middle cover 32 through a pin 53, so that the actuating member 51 and the two balance weights 38 are fixed in the direction perpendicular to the reciprocating movement direction. In this case, one end of the fixing pin 34 is connected to the middle cover 32 and the other end of the fixing pin 34 sequentially passes through the actuating member 51 and the two balance weights 38 to be connected to the gear 33. In this way, the gear 33, the two balance weights 38, and the actuating member 51 form an entire body and are together disposed on the middle cover 32. In addition, the actuating member 51 and the balance weight 38 are disposed at two different positions on the stepped shaft 331, and deflection centers of the actuating member 51 and the balance weight 38 relative to the gear 33 are different, so that frequencies of the reciprocating movements of the actuating member 51 and the balance weight 38 under the drive of the gear 33 are different.

Further, the reciprocating mechanism 30 includes a gasket 39. The gasket 39 receives the pin 53 and is configured to separate the actuating member 51 from the middle cover 32, to prevent mutual friction between the actuating member 51 and the middle cover 32.

Referring to FIG. 1 and FIG. 4 together, the reciprocating cutting tool 100 includes an operating unit 70. The operating unit 70 includes a locking member 71 disposed above a surface of the pushing member 52 facing toward the actuating member 51. An axis of the locking member is perpendicular to that of the reciprocating rod. The locking member 71 switches, under an external force, between a fixed position for limiting contact between the pushing member 52 and the actuating member 51 and a movable position allowing contact between the pushing member 52 and the actuating member 51.

Specifically, the locking member 71 is movably disposed above a position of the pushing member 52 facing toward the actuating member 51, and is provided with an unlocking groove 710 in an extending direction of the locking member 71. The unlocking groove 710 extends in an axial direction of the locking member, to provide, in the movable position, a movable space allowing the contact between the pushing member 52 and actuating member 51 for the pushing member 51. In this specific embodiment, the locking member 71 is substantially in a cylindrical rod shape, and the unlocking groove 710 is formed by chamfering an edge of the locking member 71 in the axial direction.

Further, the operating unit 70 includes a mounting plate 72, an adjusting member 73, a hollow pin 74, and a pressure spring 75. The mounting plate 72 is installed on the housing in a direction parallel to the axial direction of the pushing member 52. One end of the locking member 71 is rotatably connected to the mounting plate 72 and the other end of the locking member 71 on which the unlocking groove 710 is provided passes through the mounting plate 72 and extends to a position above the pushing member 52. The unlocking groove 710 rotates between the fixed position and the movable position when the locking member 71 rotates relative to the mounting plate 72. A surface of the mounting plate 72 back to the reciprocating rod 31 is provided with a catching groove 521 and a positioning groove 523. The positioning groove 523 is disposed on the mounting plate 72 along a rotating trace of the locking member 71 and is configured to limit a rotation stroke of the locking member 71.

The adjusting member 53 is fixedly connected to the end of the locking member 71 disposed on the mounting plate 72 and is rotatably connected to the mounting plate 72 with the locking member 71. A surface of the adjusting member 73 facing toward the mounting plate 72 is provided with a recess 730. The hollow pin 74 is movably disposed in the recess 730. The pressure spring 75 abuts between the recess 730 and the hollow pin 74. The adjusting member 73 is provided with a protrusion 731 embedded in and limited to the positioning groove 523 at a position corresponding to the positioning groove 523. When the adjusting member 73 rotates relative to the mounting plate 72 under control of an operator, the protrusion 731 slides along the positioning groove 523. When the recess 730 is aligned with the catching groove 521, the hollow pin 74 is popped out and inserted into the catching groove 521 under an action of the pressure spring 75, so that the operator knows that the gear is shifted in place.

Figure 5:
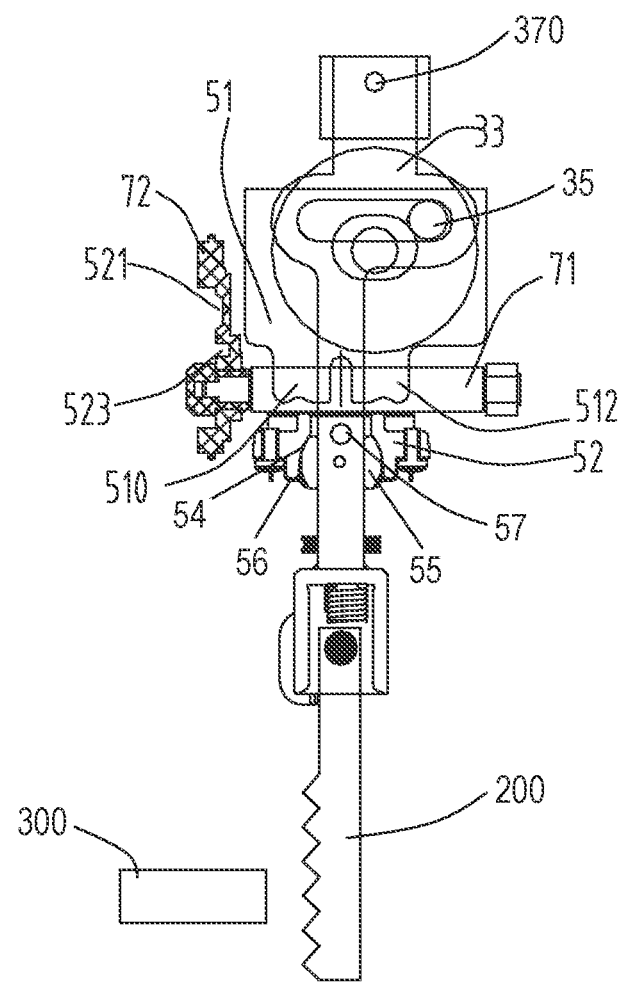
FIG. 5 is a status diagram of the reciprocating cutting tool shown in FIG. 2 when the reciprocating cutting tool doesn't implement a cutter-lifting motion.
Figure 6:
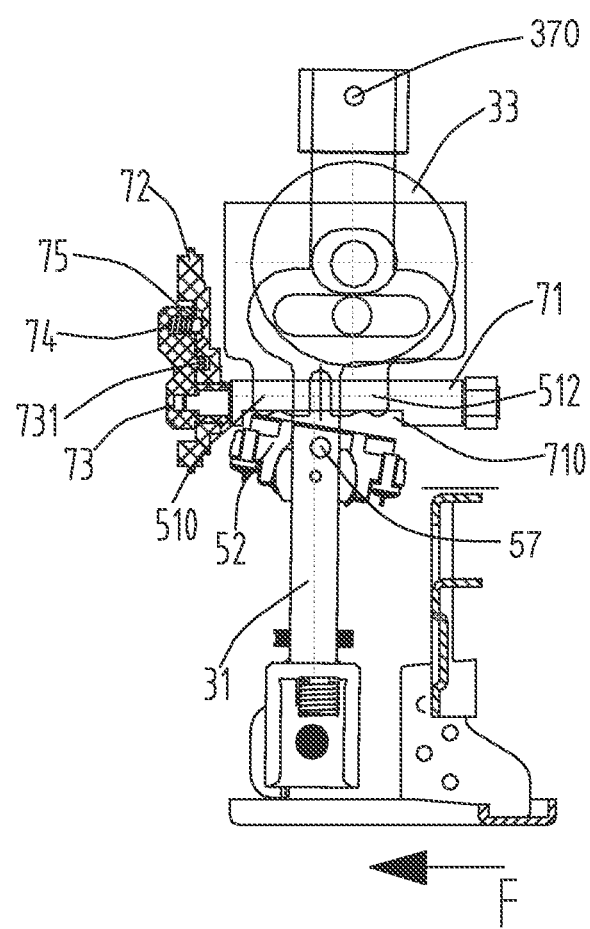
FIG. 6 is a schematic status diagram of the reciprocating cutting tool shown in FIG. 2 when a force is applied in a reciprocating saw mode.
Figure 7:
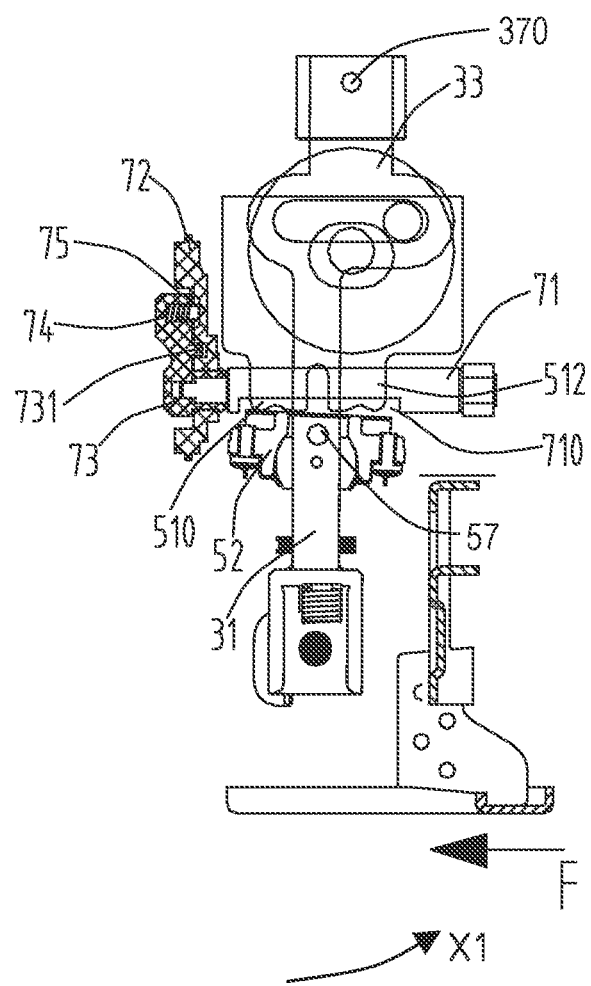
FIG. 7 is a schematic status diagram of the reciprocating cutting tool shown in FIG. 5 when the reciprocating cutting tool implements a cutter-lifting motion in a reciprocating saw mode.
Figure 8:
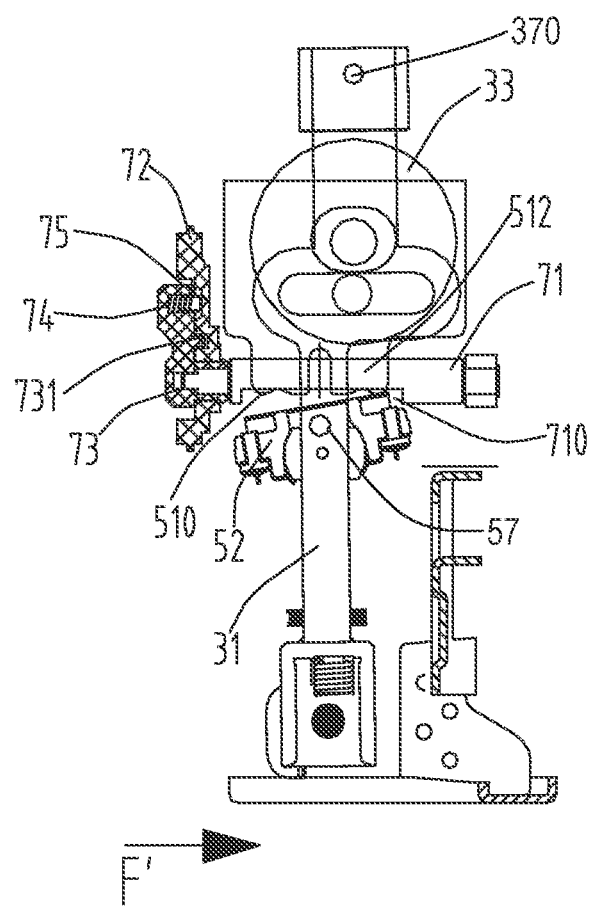
FIG. 8 is a schematic status diagram of the reciprocating cutting tool shown in FIG. 2 when a force is applied in a jig saw mode.
Figure 9:
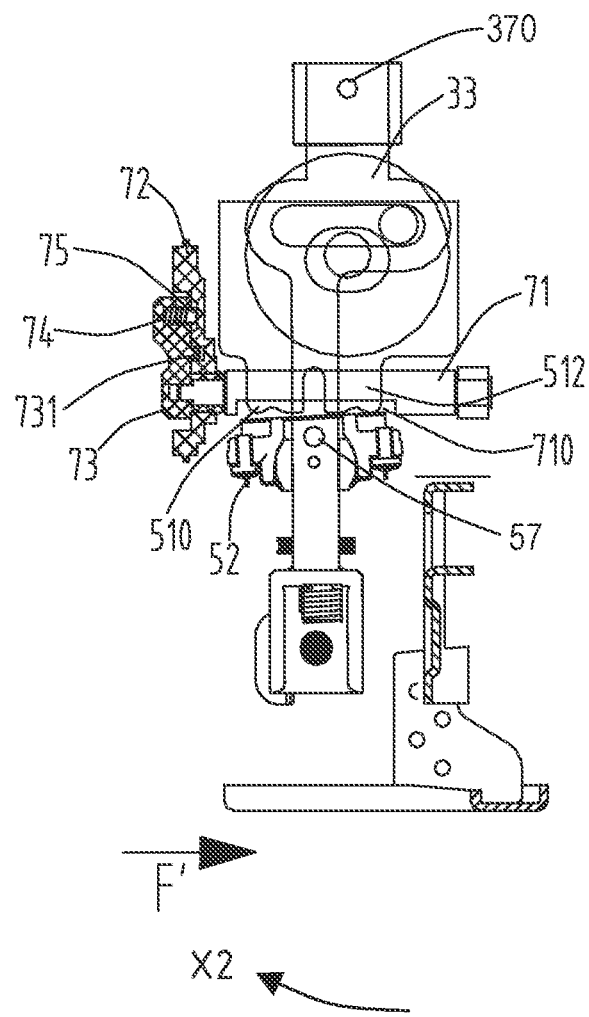
FIG. 9 is a schematic status diagram of the reciprocating cutting tool shown in FIG. 8 when the reciprocating cutting tool implements a cutter-lifting motion in a jig saw mode.

FIG. 5 is a schematic status diagram of the reciprocating cutting tool 100 when the reciprocating cutting tool 100 doesn't implement a cutter-lifting motion(that is, the locking member 71 is in the fixed position), FIG. 6 and FIG. 7 are schematic diagrams of the reciprocating cutting tool 100 when the reciprocating cutting tool 100 implements a cutter-lifting motion in the reciprocating saw mode (that is, the locking member 71 is in the movable position), and FIG. 8 and FIG. 9 are schematic diagrams of the reciprocating cutting tool 100 when the reciprocating cutting tool 100 implements a cutter-lifting motion in the jig saw mode (that is, the locking member 71 is in the movable position). To better illustrate the working principles of the reciprocating cutting tool 100 of the present invention in the two states, the following indicates the cutting force applied to the reciprocating cutting tool 100 in the reciprocating saw mode by a leftward force F, and indicates the cutting force applied to the reciprocating cutting tool 100 in the jig saw mode by a rightward force F'. This does not constitute a limitation on the technical scope of the present invention.

Referring to FIG. 5, when a cutter-lifting operation is not needed, the operator rotates the locking member 71, to shift the locking member 71 to a no-cutter-lifting gear. In this case, the unlocking groove 710 in the locking member 71 is staggered with the pushing member 52, a surface of the locking member 71 on which no unlocking groove 710 is chamfered abuts against the position above the pushing member 52, to prevent the pushing member 52 from deflecting with the reciprocating rod 31 under the cutting force, so as to limit the contact between the pushing member 52 and the first engaging portion 510 and the second engaging portion 512 in the actuating member 51.

Referring to FIG. 6 and FIG. 7 together, in the reciprocating saw mode, when a cutter-lifting motion is needed, the operator rotates the locking member 71 to shift the locking member 71 to a cutter-lifting gear. In this case, the unlocking groove 710 in the locking member 71 is rotated to the position above the pushing member 52, to provide a reserved space for deflection of the pushing member 52 with the reciprocating rod 31 under the cutting force. During up and down reciprocating movement, the reciprocating rod 31 deflects leftward under the leftward cutting force F. In this case, a left side of the pushing member 52 deflects toward the first engaging portion 510, a right side of the pushing member 52 deflects away from the second engaging portion 512, and the reciprocating rod 31 rotates in a first direction (clockwise) relative to the pivoting shaft 370. When moving downward, the first engaging portion 510 contacts the left side of the pushing member 52 and pushes the deflecting pushing member 52, and the pushing member 52 transmits an acting force to the rod portion 312 of the reciprocating rod through the oil-retaining bearing 55. It should be noted that the force is in the reciprocating movement direction (precisely, toward the direction), and therefore drives the reciprocating rod 31 (and the saw blade) to slightly swing along the pivoting shaft 370 toward the work piece, so that the cutter-lifting function of the saw blade is implemented in the reciprocating saw mode (the cutter-lifting direction X1 is shown in FIG. 7), thereby significantly improving the cutting efficiency of the reciprocating cutting tool 100.

Referring to FIG. 8 and FIG. 9 together, in the jig saw mode, when a cutter-lifting motion is needed, the operator rotates the locking member 71 to shift the locking member 71 to a cutter-lifting gear. In this case, the unlocking groove 710 in the locking member 71 is rotated to the position above the pushing member 52, to provide a reserved space for deflection of the pushing member 52 with the reciprocating rod 31 under the cutting force. During up and down reciprocating movement, the reciprocating rod 31 deflects rightward under the rightward cutting force F'. In this case, a right side of the pushing member 52 deflects toward the second engaging portion 512, a left side of the pushing member 52 deflects away from the first engaging portion 510, and the reciprocating rod 31 rotates in a second direction (counterclockwise) relative to the pivoting shaft 370. When moving downward, the second engaging portion 512 contacts the right side of the pushing member 52 and pushes the deflecting pushing member 52, and the pushing member 52 transmits a force to the rod portion 312 of the reciprocating rod through the oil-retaining bearing 55, to drive the reciprocating rod 31 (and the saw blade 200) to slightly swing along the pivoting shaft 370 toward the work piece 300, so that the cutter-lifting function of the saw blade is implemented in the jig saw mode (the cutter-lifting direction X2 is shown in FIG. 9), thereby significantly improving the cutting efficiency of the reciprocating cutting tool 100.

In the present invention, by the reciprocating cutting tool 100, the actuating member 51 engages with the pushing member 52 in the two modes, namely, the reciprocating saw mode and the jig saw mode, so that the reciprocating rod 31 can be driven to implement a cutter-lifting motion in the two different modes, to improve the cutting efficiency of the reciprocating cutting tool 100.

The foregoing embodiments only describe several implementation manners of the present invention, and their description is specific and detailed, but cannot therefore be understood as a limitation to the patent scope of the present invention. It should be noted that a person of ordinary skill in the art may further make variations and improvements without departing from the conception of the present invention, and these all fall within the protection scope of the present invention. Therefore, the patent protection scope of the present invention should be subject to the appended claims.

What is claimed is:

1. A reciprocating cutting tool, wherein the reciprocating cutting tool is operable in two working modes which includes a reciprocating saw mode and a jig saw mode; the reciprocating cutting tool comprising a housing a reciprocating mechanism, and an actuating mechanism and a cutter-lifting mechanism both disposed in the housing; the reciprocating mechanism comprises a reciprocating rod disposed in the housing, and the cutter-lifting mechanism comprises an actuating member and a pushing member, wherein the pushing member is disposed on the reciprocating rod; the actuating member comprises a first engaging portion and a second engaging portion for engaging with the pushing member respectively; when the reciprocating rod is driven to perform a reciprocating motion relative to the housing by the actuating mechanism, the reciprocating rod under a cutting force drives the pushing member to deflect in a first direction close to one of the first engaging portion or the second engaging portion; and when the one of the first engaging portion or the second engaging portion is driven to move toward the pushing member by the actuating mechanism, the one of the first engaging portion or the second engaging portion pushes the pushing member to deflect in a second, opposite direction to force the reciprocating rod to implement a cutter-lifting motion.

2. The reciprocating cutting tool according to claim 1, wherein the actuating member is a fork, the first engaging portion and the second engaging portion are disposed at an interval at two opposite ends of the fork on a side close to the pushing member, wherein during the cutting force the one of the first engaging portion or the second engaging portion moves toward the pushing member and contacts the side of the pushing member on a corresponding one of the ends thereof.

3. The reciprocating cutting tool according to claim 2, wherein the reciprocating mechanism comprises a gear and the reciprocating rod is eccentrically connected to the gear; the actuating mechanism comprises a power member and a transmission gear driven by the power member, and the transmission gear is driven by the power member and engages with the gear; and the reciprocating mechanism comprises a balance weight, an eccentric shaft is protrudingly disposed on a surface of the gear, the eccentric shaft is arranged in a stepped manner and comprises a high position surface and a low position surface, the fork is connected to the low position surface of the eccentric shaft, and the balance weight is disposed between the fork and the gear and is connected to the high position surface of the eccentric shaft.

4. The reciprocating cutting tool according to claim 3, wherein the high position surface is located at an end of the eccentric shaft close to the gear and the low position surface is located at an end of the eccentric shaft away from the gear.

5. The reciprocating cutting tool according to claim 1, wherein the cutter-lifting mechanism comprises a supporting seat and an oil-retaining bearing, the oil-retaining bearing is supported on the supporting seat, the supporting seat is fixed to the pushing member, and the reciprocating rod extends through the oil-retaining bearing.

6. The reciprocating cutting tool according to claim 1, wherein the reciprocating cutting tool comprises an operating unit, the operating unit comprises a locking member disposed above the pushing member, the locking member is shiftable between a fixed position where it limits the pushing member contacting with the actuating member and a movable position where it allows the pushing member to contact the actuating member.

7. The reciprocating cutting tool according to claim 6, wherein an axis of the locking member is perpendicular to that of the reciprocating rod.

8. The reciprocating cutting tool according to claim 7, wherein the locking member is movably disposed on the pushing member close to the actuating member, and an unlocking groove is provided on the locking member along an extending direction.

9. The reciprocating cutting tool according to claim 8, wherein the operating unit comprises a mounting plate, the mounting plate is mounted on the housing, a first end of the locking member is rotatably connected to the mounting plate, a second end of the locking member passes through the mounting plate and extends above the pushing member, and the unlocking groove rotates between the fixed position and the movable position when the locking member rotates relative to the mounting plate.

10. The reciprocating cutting tool according to claim 9, wherein the operating unit comprises an adjusting member, a hollow pin, and a pressure spring; a surface of the mounting plate is provided with a catching groove; the adjusting member is fixedly connected to the first end of the locking member and is rotatably connected to the mounting plate with the locking member; a surface of the adjusting member facing to the mounting plate is provided with a recess; the hollow pin is movably disposed in the recess; the pressure spring abuts between the recess and the hollow pin; and the hollow pin is caught in the catching groove under a restoring force of the pressure spring.

11. The reciprocating cutting tool according to claim 10, wherein the mounting plate is provided with a positioning groove, and the positioning groove extends along a rotating trace of the locking member; and the adjusting member is provided with a protrusion embedded in and limited to the positioning groove at a position corresponding to the positioning groove.

12. A reciprocating cutting tool, comprising a housing, a reciprocating mechanism, an actuating mechanism driving the reciprocating mechanism, and a cutter-lifting mechanism, wherein the reciprocating mechanism comprises a reciprocating rod driven by the actuating mechanism to perform a reciprocating motion, the cutter-lifting mechanism comprises an actuating member and a pushing member, and the actuating member comprises a first engaging portion and a second engaging portion, wherein the actuating member is movable linearly to drive the pushing member to rotate, so that when the reciprocating cutting tool is in a first working mode, the first engaging portion is capable of driving the pushing member to rotate the pushing member to move the reciprocating rod along a first direction transverse to the reciprocating motion, and when the reciprocating cutting tool is in a second working mode, the second engaging portion is capable of driving the pushing member to rotate the pushing member to move the reciprocating rod along a second, opposite direction.

* * * * *